United States Patent
Smialek et al.

(10) Patent No.: US 10,992,701 B2
(45) Date of Patent: Apr. 27, 2021

(54) SYSTEMS AND METHODS FOR DYNAMIC TARGETING OF SECURE REPURPOSED CROSS-CHANNEL ELECTRONIC COMMUNICATIONS

(71) Applicant: BANK OF AMERICA CORPORATION, Charlotte, NC (US)

(72) Inventors: Todd Anthony Smialek, Fort Mill, SC (US); Nicholas Edward Peach, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 296 days.

(21) Appl. No.: 16/196,209

(22) Filed: Nov. 20, 2018

(65) Prior Publication Data

US 2020/0162504 A1 May 21, 2020

(51) Int. Cl.
*H04L 29/06* (2006.01)

(52) U.S. Cl.
CPC .......... *H04L 63/1441* (2013.01); *H04L 63/08* (2013.01); *H04L 63/1416* (2013.01); *H04L 63/20* (2013.01)

(58) Field of Classification Search
CPC ..... H04L 63/1441; H04L 63/20; H04L 63/08; H04L 63/1416
See application file for complete search history.

(56) References Cited

U.S. PATENT DOCUMENTS

| | | | |
|---|---|---|---|
| 7,665,135 B1* | 2/2010 | Mohiuddin | H04L 63/0218 726/22 |
| 9,280,911 B2 | 3/2016 | Sadeh-Koniecpol et al. | |
| 9,373,267 B2 | 6/2016 | Sadeh-Koniecpol et al. | |
| 9,398,029 B2 | 7/2016 | Sadeh-Koniecpol et al. | |
| 9,547,998 B2 | 1/2017 | Sadeh-Koniecpol et al. | |
| 9,558,677 B2 | 1/2017 | Sadeh-Koniecpol et al. | |
| 9,606,893 B2 | 3/2017 | Gupta et al. | |
| 9,807,077 B2* | 10/2017 | Gounares | H04L 63/08 |
| 9,813,454 B2 | 11/2017 | Sadeh-Koniecpol et al. | |
| 9,870,715 B2 | 1/2018 | Sadeh-Koniecpol et al. | |
| 2004/0088570 A1* | 5/2004 | Roberts | G06F 21/566 726/25 |
| 2004/0187010 A1* | 9/2004 | Anderson | G06F 21/564 713/188 |
| 2010/0169972 A1* | 7/2010 | Kuo | G06F 21/564 726/23 |
| 2011/0016530 A1* | 1/2011 | Fossen | G06F 21/564 726/24 |
| 2011/0321160 A1* | 12/2011 | Mohandas | G06F 21/56 726/22 |

(Continued)

*Primary Examiner* — Sarah Su
(74) *Attorney, Agent, or Firm* — Michael A. Springs; Moore & Van Allen PLLC; Nicholas C. Russell

(57) ABSTRACT

Embodiments of the invention are directed to a system, method, or computer program product for dynamic targeting and training via repurposing malicious electronic communications via scrubbing for transmission within the entity. In this way, the invention may receive malicious electronic communications, block those communications, scrub the malicious data from the communication, and repurpose the now clean electronic communication as repurposed malicious electron communications configured for facilitating training and authentication escalation of user application access.

15 Claims, 7 Drawing Sheets

(56) References Cited

U.S. PATENT DOCUMENTS

| | | | |
|---|---|---|---|
| 2011/0321166 A1* | 12/2011 | Capalik | H04L 63/1416 |
| | | | 726/25 |
| 2013/0303085 A1* | 11/2013 | Boucher | H04W 4/80 |
| | | | 455/41.1 |
| 2016/0180735 A1 | 6/2016 | Clark et al. | |
| 2017/0006049 A1* | 1/2017 | Muttik | H04L 63/1425 |
| 2019/0260770 A1* | 8/2019 | Sansom | G06N 20/00 |
| 2020/0021606 A1* | 1/2020 | Cardinal | H04L 63/08 |

\* cited by examiner

SYSTEMS AND METHODS FOR DYNAMIC TARGETING OF SECURE REPURPOSED CROSS-CHANNEL ELECTRONIC COMMUNICATIONS

BACKGROUND

Over the last few years, there has been a significant increase in the number of electronic activities, particularly online and mobile activities due to widespread use of smartphone, tablet computers, laptop computers and electronic computing devices in general. These electronic activities typically entail a multitude of electronic communications that are received at and sent from a variety of communication media, systems, and networks. However, the multitude of electronic communications may comprise unsecure or malicious electronic communications whose veracity cannot be easily confirmed by users before the unsecure or malicious electronic communications initiate unauthorized actions that may jeopardize the security and safety of users' electronic information and that of user devices.

Therefore, proactively identifying unsecure or malicious electronic communications is crucial for preventing unauthorized exposure of users' electronic information and ensuring the security of user devices. The present invention provides a novel method of dynamically repurposing, constructing, customizing, and targeting adaptive malicious electronic communications to users for unsecure communication identification, in real-time across a plurality of communication channels and media, which provides a solution to the problem of identifying unsecure or malicious electronic communications before they cause unauthorized actions.

The previous discussion of the background to the invention is provided for illustrative purposes only and is not an acknowledgement or admission that any of the material referred to is or was part of the common general knowledge as at the priority date of the application.

SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for dynamic targeting and training via repurposing malicious electronic communications via scrubbing for transmission within the entity.

In one aspect, the present invention is directed to in general a system, method and computer program product for cross-channel electronic communication security. The system is configured to provide dynamic repurposing and targeting of malicious electronic communications for unsecure communication identification. In this way, the system may receive malicious electronic communications, block those communications, scrub the malicious data from the communication, and repurpose the now clean electronic communication and distribute it to one or more users for malicious electronic communications training. In this way, the malicious electronic communications training includes a real malicious electronic communication with logos, fonts, and the like that is scrubbed clean of any malicious content. The system is typically configured for facilitating training of users for the purposes of identifying unsecure and malicious electronic communications, and further customizing and tailoring subsequent simulations based on unsuccessful or successful identification of repurposed malicious electronic communications by the user. The system typically includes at least one processing device operatively coupled to at least one memory device and at least one communication device configured to establish operative communication with a plurality of networked devices via a communication network.

Embodiments of the invention relate to systems, methods, and computer program products for repurposed electronic communication security, the invention comprising: blocking an incoming malicious electronic communication at an entity level prior to being distributed to a user within the entity, wherein the incoming malicious electronic communication is associated with a first electronic communication medium; generating a repurposed malicious electronic communication for the user, wherein the repurposed malicious electronic communication a scrubbed version of the incoming malicious electronic communication; transmitting, via a first communication channel, the repurposed malicious electronic communication to a user device of the user associated with the first electronic communication medium; and determining a user action performed by the user on the repurposed malicious electronic communication.

In some embodiments, scrubbing the incoming malicious electronic communication further comprises removing malicious content including malicious URL links while maintaining a same visual appearance as the incoming malicious electronic communication.

In some embodiments, generating a repurposed malicious electronic communication for the user further comprises: identifying an unsecure portion of the incoming malicious electronic communication, wherein the unsecure portion is associated with an unauthorized activity; and constructing a repurposed unsecure component based on the unsecure portion such that the repurposed unsecure component is visually similar but not associated with the unauthorized activity, wherein constructing the repurposed malicious electronic communication further comprises removing the unsecure component from the incoming malicious electronic communication from the repurposed malicious electronic communication and replacing the unsecure component with the repurposed unsecure component.

In some embodiments, the invention further comprises: determining, via an embedded action tag within the repurposed malicious electronic communication, the user action performed by the user comprising a unsuccessful identification of the repurposed malicious electronic communication at a user application; and escalating authentication requirements of the user for access to the user interface based on the unsuccessful identification of the repurposed malicious electronic communication.

In some embodiments, determining the user action performed by the user on the repurposed malicious electronic communication further comprises embedding an action tag in a body of the repurposed malicious electronic communication, wherein the action tag is structured for determining a user action associated with the repurposed malicious electronic communication, wherein the action tag comprises a tracking pixel.

In some embodiments, the invention further comprises: generating a second repurposed malicious electronic communication for the user based on the user action, wherein the second repurposed malicious electronic communication is associated with a second electronic communication medium; transmitting, via a second communication channel associated with the second electronic communication medium, the second repurposed malicious electronic communication to the user; determining, via an embedded action tag, a user action performed by the user comprising a unsuccessful identification of the second repurposed malicious electronic communication at a user application; and escalating authentication requirements of the user for access to the user interface based on the unsuccessful identification of the second repurposed malicious electronic communication.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
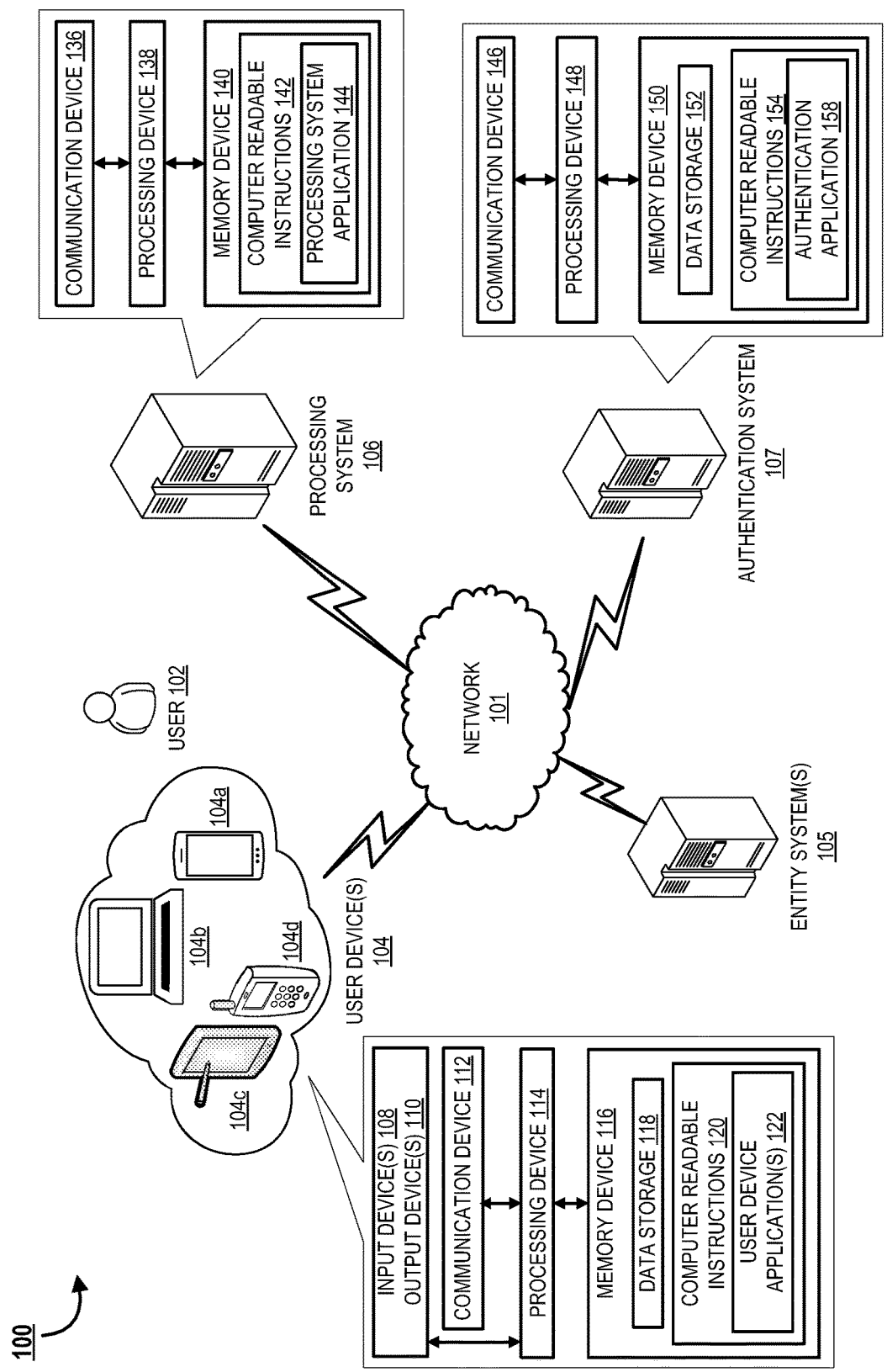
Figure 2A:
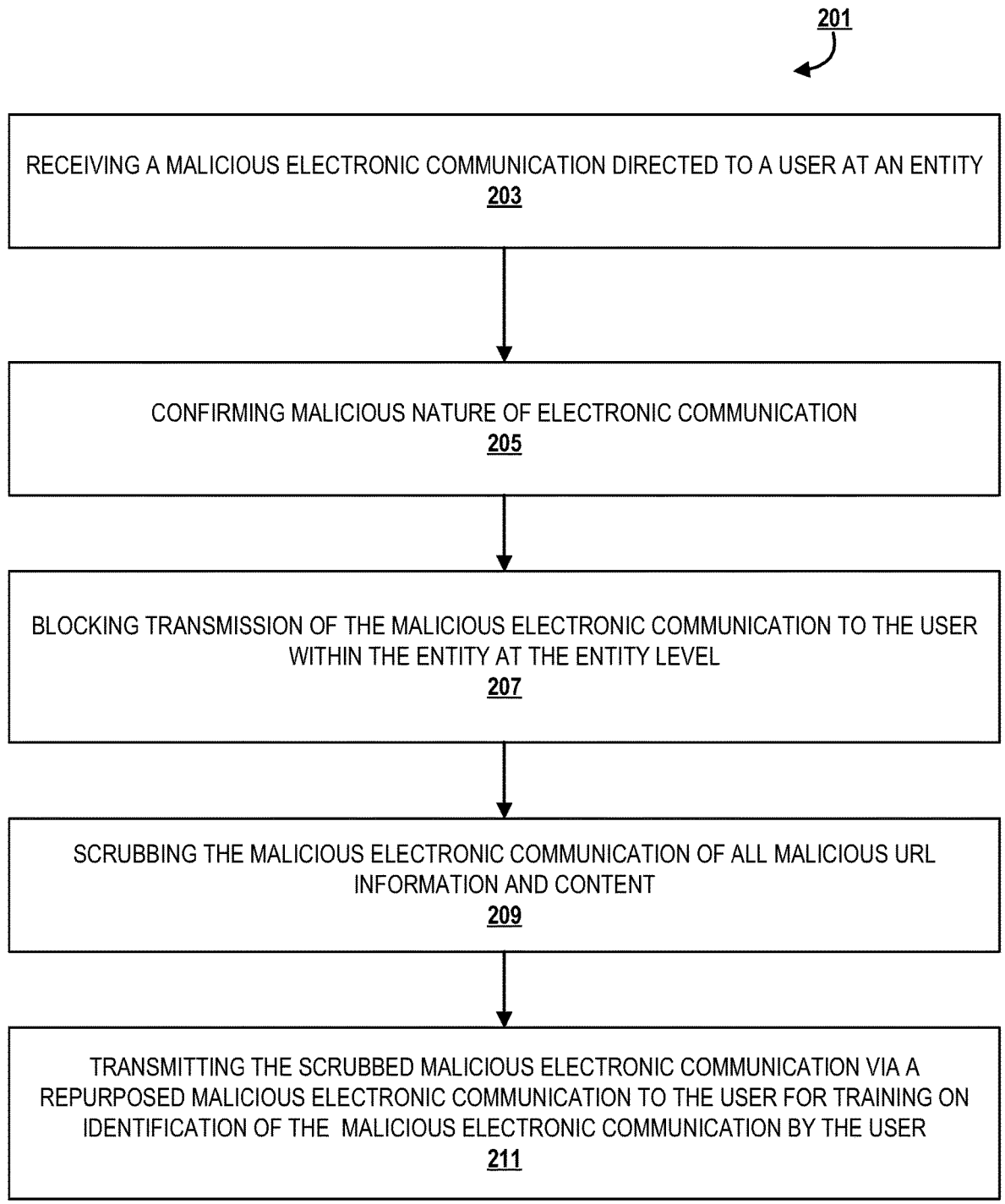
Figure 2B:
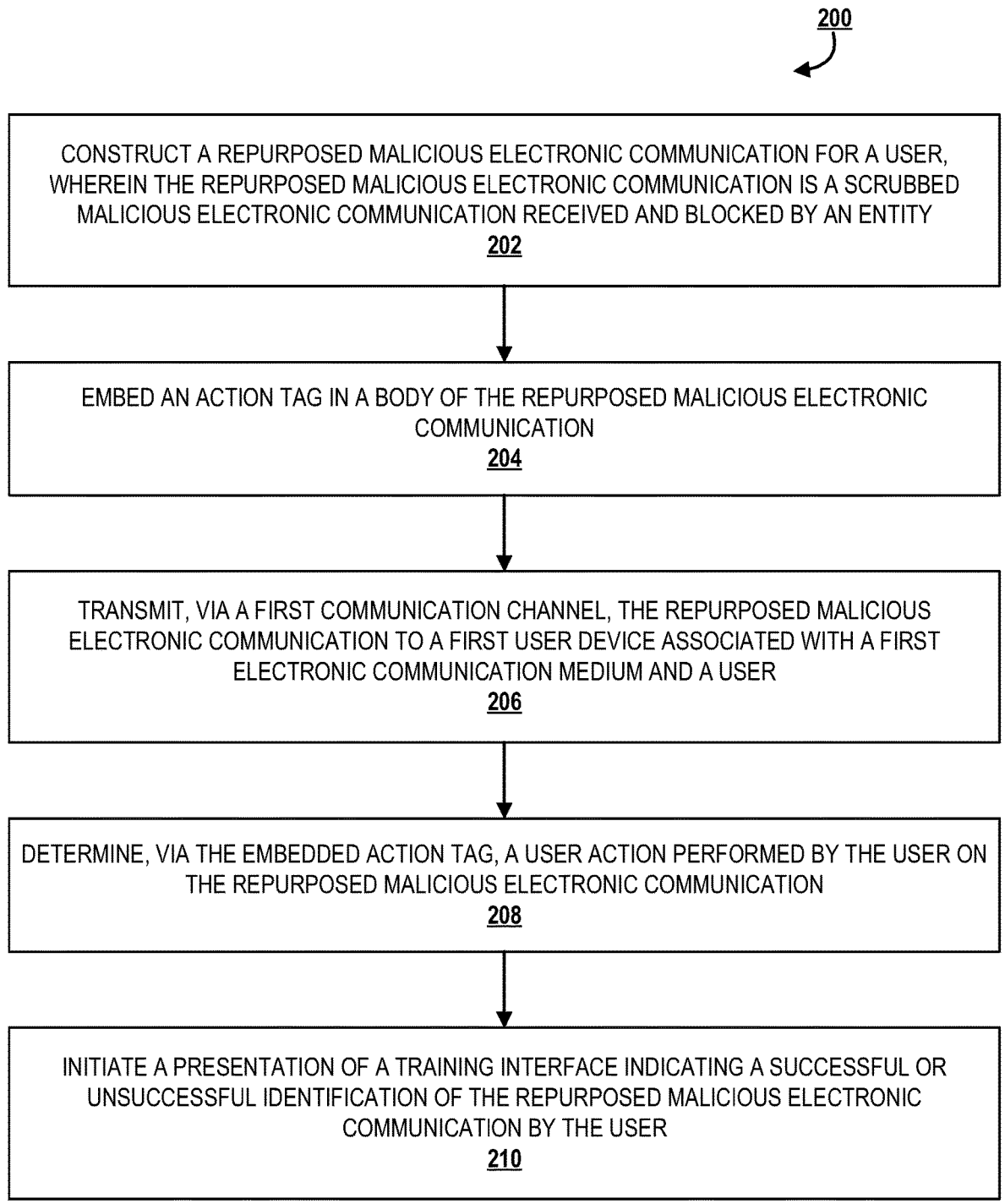
Figure 3:
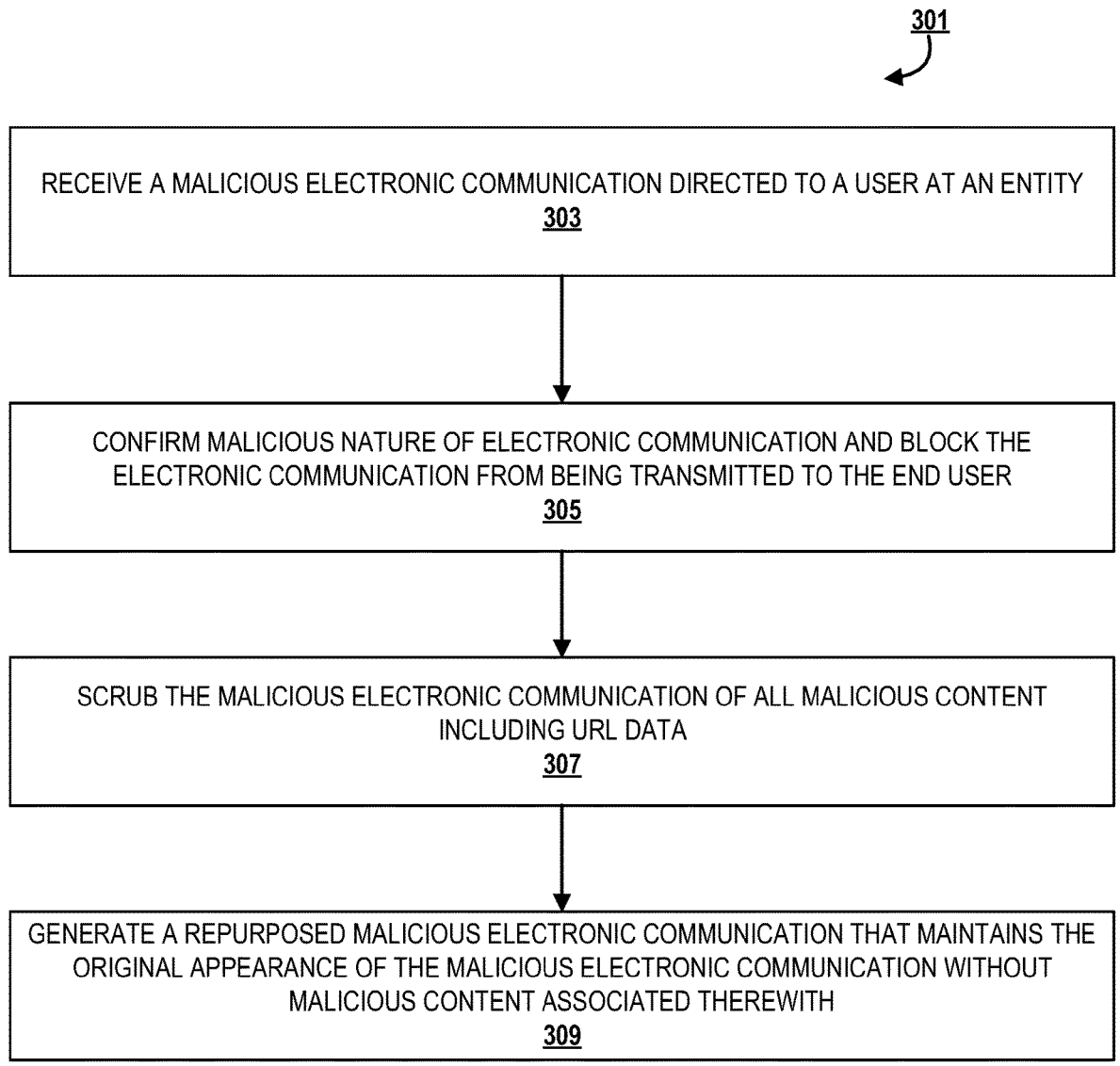
Figure 4:
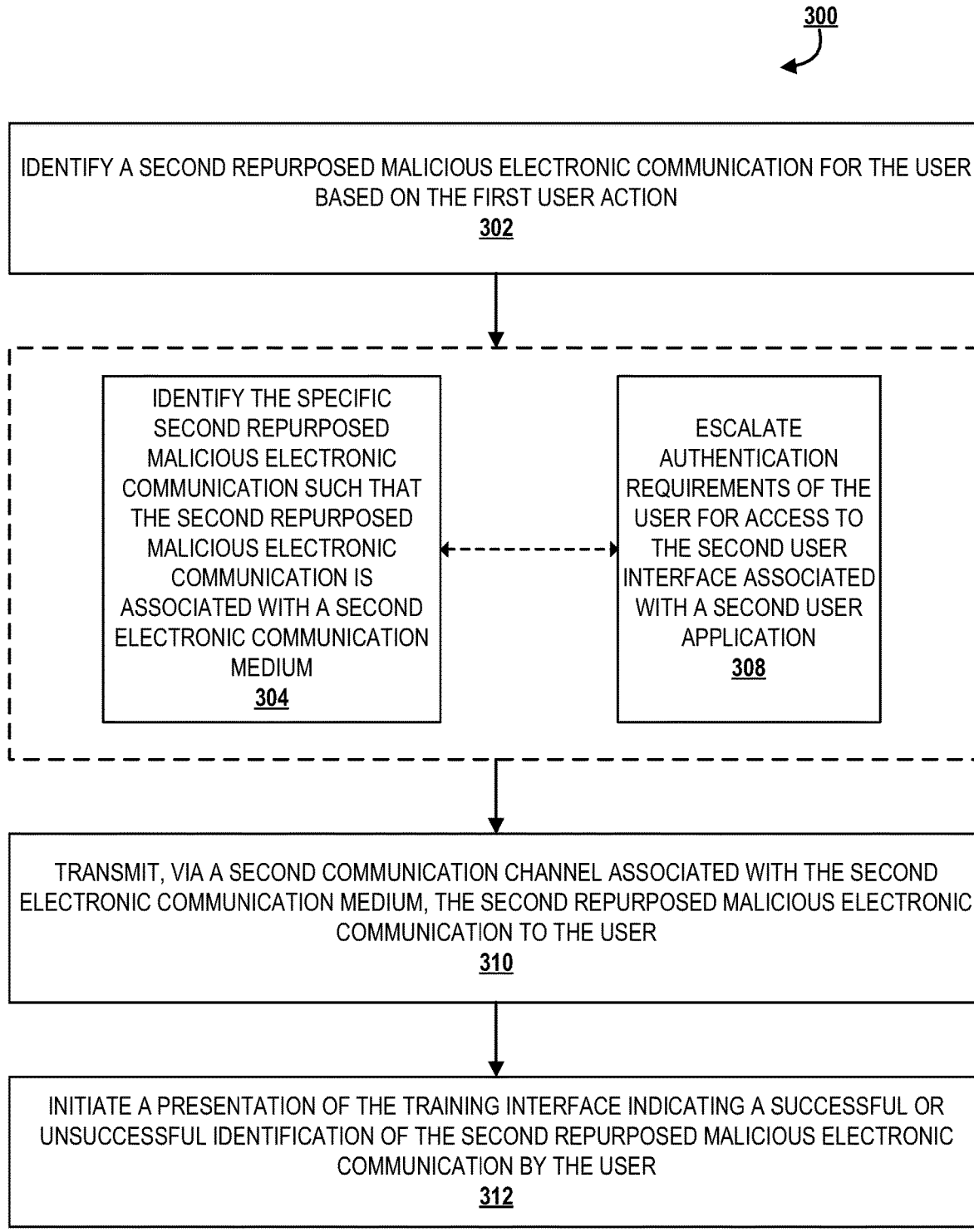
Figure 5A:
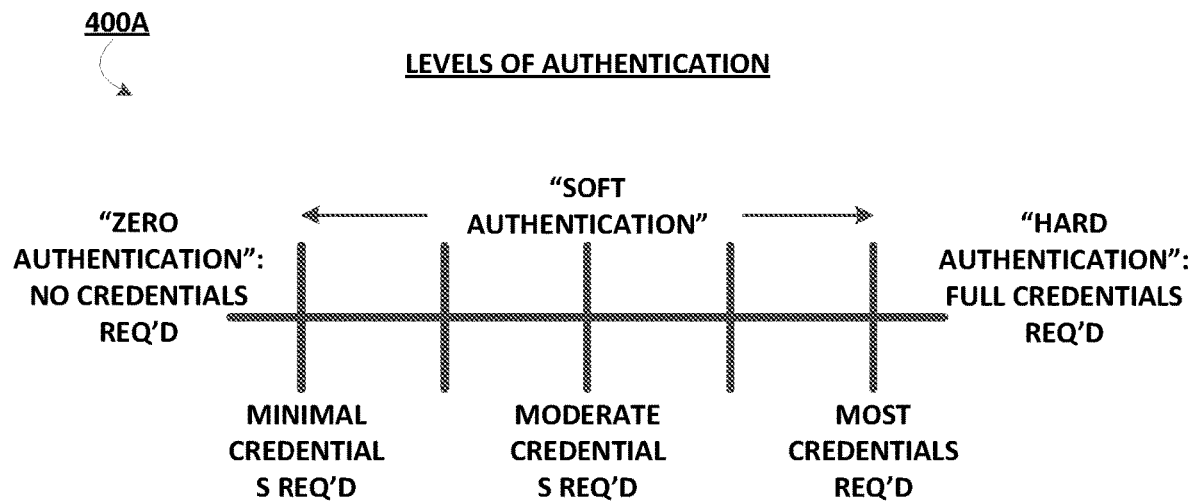
Figure 5B:
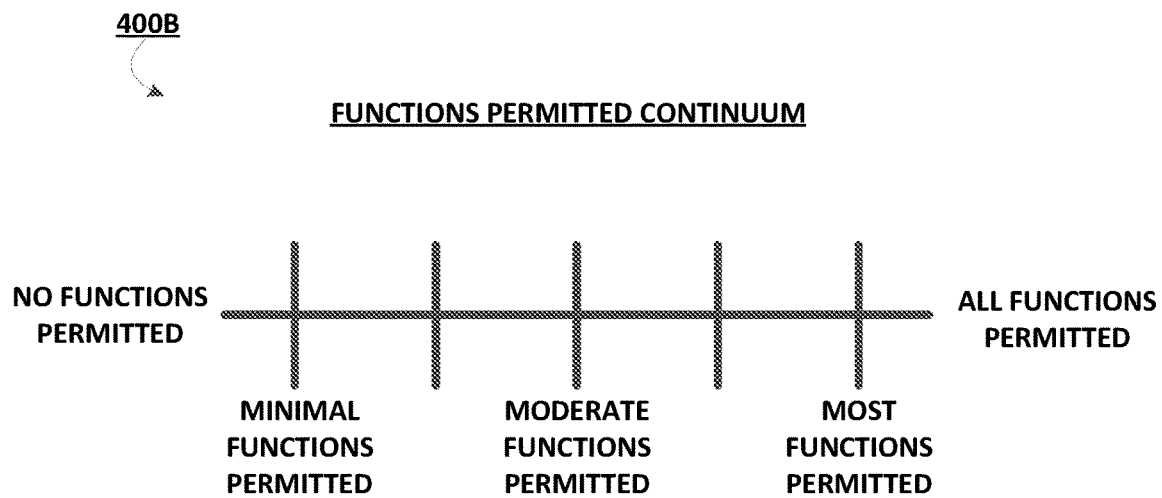
Figure 5C:
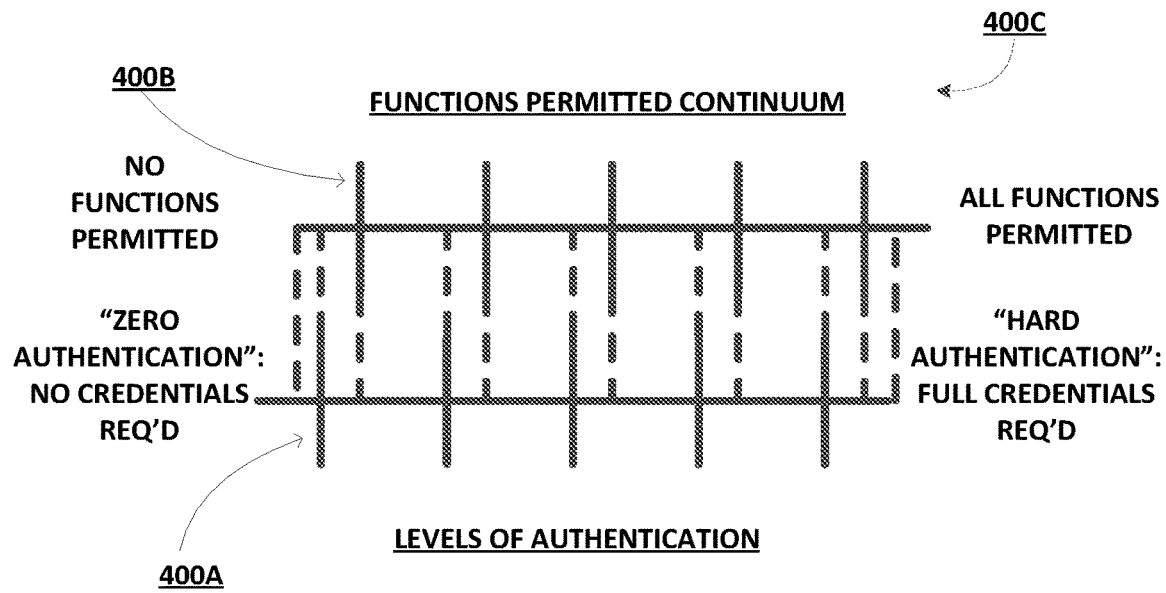
Figure 5D:
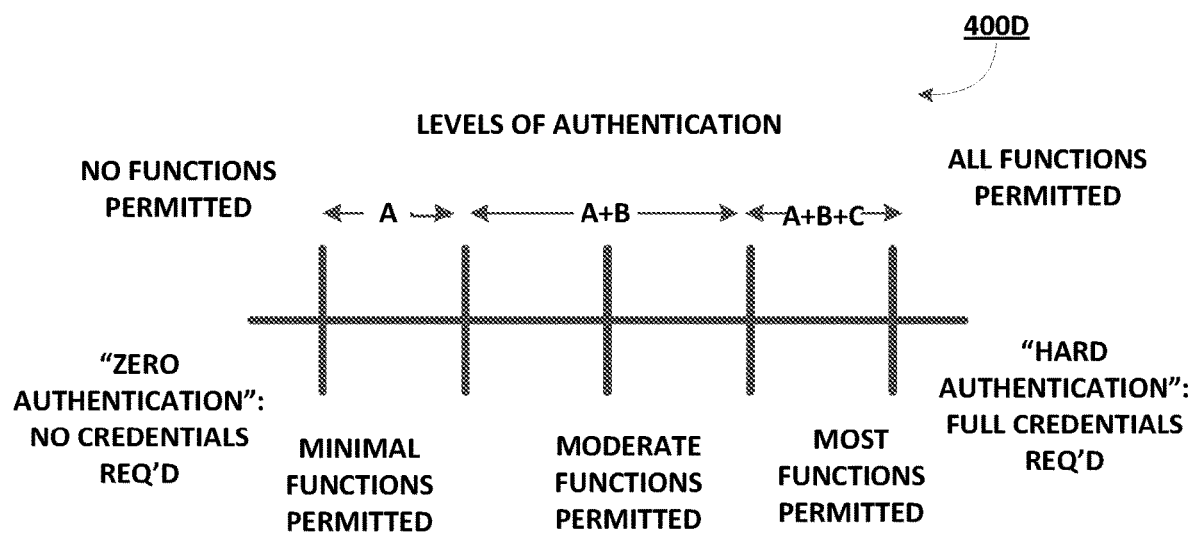

Having thus described embodiments of the invention in general terms, reference will now be made the accompanying drawings, wherein:

FIG. 1 depicts a dynamic targeting of secure repurposed electronic communications system environment, in accordance with an aspect of the present invention;

FIG. 2A depicts a high level process flow of repurposing malicious electronic communications, in accordance with some embodiments of the invention;

FIG. 2B depicts a high level process flow of presenting repurposing malicious electronic communications for electronic communication training, in accordance with some embodiments of the invention;

FIG. 3 depicts a high level process flow for identifying and scrubbing received malicious electronic communications, in accordance with some embodiments of the invention;

FIG. 4 depicts a high level process flow for training via the repurposed malicious electronic communications, FIG. 5A presents an illustration of the authentication continuum in accordance to one embodiment of the invention;

FIG. 5B presents an illustration of the functions permitted continuum, in accordance to one embodiment of the invention;

FIG. 5C presents an illustration of the coupling of the functions permitted continuum and the levels of authentication continuum, in accordance to one embodiment of the invention; and FIG. 5D presents an illustration of the relationship between the functions permitted and the authentication types, in accordance to one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by an entity. In other embodiments, an "entity" may not be a financial institution.

Unless specifically limited by the context, a "user activity", "transaction" or "activity" refers to any communication between the user and a financial institution or another entity. In some embodiments, for example, a user activity may refer to a purchase of goods or services, a return of goods or services, a payment transaction, a credit transaction, or other interaction involving a user's bank account. As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a user activity or transaction may refer to one or more of a sale of goods and/or services, an account balance inquiry, a rewards transfer, an account money transfer, opening a bank application on a user's computer or mobile device, a user accessing their e-wallet (e.g., mobile wallet) or online banking account or any other interaction involving the user and/or the user's device that is detectable by the financial institution. As further examples, a user activity may occur when an entity associated with the user is alerted via the transaction of the user's location. A user activity may occur when a user accesses a building or a dwelling, uses a rewards card, and/or performs an account balance query. A user activity may occur as a user's device establishes a wireless connection, such as a Wi-Fi connection, with a point-of-sale terminal. In some embodiments, a user activity may include one or more of the following: purchasing, renting, selling, and/or leasing goods and/or services (e.g., groceries, stamps, tickets, DVDs, vending machine items, and the like); withdrawing cash; making payments (e.g., paying monthly bills; paying federal, state, and/or local taxes; and the like); sending remittances; transferring balances from one account to another account; loading money onto stored value cards (SVCs) and/or prepaid cards; donating to charities; and/or the like.

As used herein, an "online banking account" is an account that is associated with one or more user accounts at a financial institution. For example, the user may have an online banking account that is associated with the user's checking account, savings account, investment account, and/or credit account at a particular financial institution. Authentication credentials comprising a username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

A "user" may be an individual or group of individuals associated with an entity who receives one or more electronic communications. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

An "electronic communication" may refer to an email, a text message, a social media post, a message associated with a messaging application, a user device notification, a notification associated with an application of a user device, a pop-up notification, a communication associated with exchanging messages between users/devices using electronic devices, and/or the like.

With advancements in technology infrastructures and wireless communication implementation, user devices, such as laptop computers, tablet computers, mobile phones, smart phones, wearable devices, smart television, and the like are common. Each user is typically associated with multiple user devices, e.g., a user may be associated with a smart phone, a laptop computer and another smart device (such as a wearable device, a smart television, a tablet device and/or the like). These user devices have the capability to hold large amounts of information, including personal information, resource data (information associated with user resources like banking accounts, payment instruments like credit cards and the like), and/or have access to a central storage of such data. In other aspects the user devices may enable access to resource data stored at other sources and databases based on requisite authorization. These devices may also be configured to enable the user to perform one or more activities, transactions or resource transfers through an application via online banking, mobile banking, mobile wallets and the like.

As such, advancements in technology have facilitated numerous new methods for sending and receiving electronic communications across user devices, from a myriad external sources, servers and systems, and across various communication channels/media (e.g., cloud networks, WAN networks, cellular communication, device applications, third party applications, social media applications, browsers, or the like).

However, the multitude of electronic communications may comprise unsecure or malicious electronic communications whose veracity cannot be easily confirmed by users before the unsecure or malicious electronic communications initiate unauthorized actions (e.g., a breach of security (e.g., a phishing event, a hacking event, or the like where unauthorized access to user information and devices may have been obtained by unauthorized individuals, unbeknownst to the user) adversely affect the security of user information and compromise the security of not just the user device that was breached, but also other connected user devices or other user devices that contain corresponding applications. However, the user may not be aware of a compromise of the user data or user device until the intercepted data is used to perform at least one unauthorized activity/transaction at a later time, while the user's information continues to be at stake, or until an associated entity (e.g., a financial institution, a service provider, or the like) informs the user of the compromise of security, by which time unauthorized individuals may have performed unauthorized actions in the meantime using the user's information without the user's knowledge/permission. In such instances, identifying the mode of the exposure and the specific technological parameter that needs to be addressed may be possible, if at all, after a significant time lapse succeeding the unauthorized activity. Here, identification of malicious electronic communications by the user and preventing unauthorized actions is crucial. Hence, a need exists for predictive and proactive cross-channel electronic communication security, and dynamic escalation of authentication in real-time based on user actions, to ensure safety and security of user information.

The present invention provides a solution to the foregoing problems by providing a cross-channel electronic communication security system. The system is configured to provide dynamic repurposing and targeting of malicious electronic communications for unsecure communication identification. In this way, the system may receive malicious electronic communications, block those communications, scrub the malicious data from the communication, and repurpose the now clean electronic communication and distribute it to one or more users for malicious electronic communications training. In this way, the malicious electronic communications training includes a real malicious electronic communication with logos, fonts, and the like that is scrubbed clean of any malicious content. The system is typically configured for facilitating training of users for the purposes of identifying unsecure and malicious electronic communications, and further customizing and tailoring subsequent simulations based on unsuccessful or successful identification of repurposed malicious electronic communications by the user. The system typically includes at least one processing device operatively coupled to at least one memory device and at least one communication device configured to establish operative communication with a plurality of networked devices via a communication network.

The present invention provides novel technology for dynamically reconstructing real malicious communications, which includes the fonts, logos, and the like of the real malicious communication, that are scrubbed of malicious content, thus aid in training a user to identify real malicious communications. Moreover, the present invention provides novel technology for dynamically constructing and fundamentally transforming electronic communications from one channel/medium to another for a variety of communications media/channels such that the simulations are compatible with the technical specification of the respective medium. In addition, the present invention is further configured for tailoring, transforming and constructing the repurposed communications one channel/medium, dynamically and in response to user actions on repurposed communications on another channel/medium, thereby improving interconnectivity of simulations presented across various channels/media. These technical improvements and solutions are not possible in the absence of the present invention.

Moreover, the present invention provides a novel solution configured to dynamically assess the authentication requirements, based on the user actions performed on repurposed communications, to ensure security and safety of the user's financial and personal information. In such instances of determined potential compromise (e.g., when a user incorrectly identifies a repurposed malicious communication as being benign), the system may escalate, in real-time, the required level of authentication from the existing level (for example, a passcode) to a higher level (for example, a fingerprint scan) for executing a certain user activity as long as the parameters associated with the activity deem to require such. In some embodiments, the system may deny/decline the request to execute a user activity based on the foregoing, to safeguard personal information. Finally, the present invention is also configured to dynamically construct, tailor and customize the simulations based on the user information, annual communication cycles, known malicious communications, user actions, and/or the like to scrub real malicious communications of malicious content and repurpose those communications such that they most closely mimic real malicious communications that the user may receive and the medium/channel in which they are most likely to be received, in order to prevent the real malicious communications from jeopardizing the security of user information and devices.

FIG. 1 depicts a dynamic targeting of secure repurposed electronic communications system environment 100, in accordance with an aspect of the present invention. FIG. 1 provides a unique system that includes specialized servers and systems, communicably linked across a distributive network required to perform the functions described herein. As illustrated in FIG. 1, a processing system 106 is operatively coupled, via a network 101 to user system(s) 104 (e.g., a plurality of user devices 104a-104d), to an authentication system 107, entity system(s) 105 (e.g., a social media system, a financial institution system, a merchant system, other systems associated with a user 102 and/or other systems/servers associated with electronic communications) and/or other systems not illustrated herein. In this way, the processing system 106 can send information to and receive information from the user device(s) 104, the entity system 105 and the authentication system 107. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves, light waves or any other suitable means.

In some embodiments, the user 102 is an individual that has, owns or is otherwise associated with one or more user devices 104, and typically a plurality of user devices 104, that are structured for receiving electronic communications, that comprise user applications/widgets structured for receiving/displaying electronic communications, and/or that facilitate/allow the user to perform one or more user activities. The user devices typically comprise one or more of a smart phone 104a, a laptop or desktop computer 104b, a mobile phone or a personal digital assistant 104d, a tablet device 104c, wearable smart devices, smart television devices, home controllers, smart speakers, and/or other computing devices. In some embodiments, the user may be associated with a first user device (e.g., the tablet device 104c, a laptop or desktop computer 104b, or another smart/computing device) and a second user device (e.g., the smart phone 104a, or any of the user devices listed above).

FIG. 1 also illustrates a representative user system/device 104. As discussed, the user device(s) 104 may be, for example, a desktop personal computer, a mobile system, such as a cellular phone, smart phone, personal digital assistant (PDA), laptop, or the like, and each of the user devices (e.g., devices 104a-104d) may comprise the technical/electronic components described herein. The user device(s) 104 generally comprises a communication device 112, a processing device 114, a memory device 116, input device(s) 108 and output device(s) 110. The user device 104 may comprise other devices that are not illustrated, configured for location determination/navigation (GPS devices, accelerometers and other positioning/navigation devices), for authentication (fingerprint scanners, microphones, iris scanners, facial recognition devices/software and the like), for image capture (cameras, AR devices, and the like), for display (screens, hologram projectors and the like), and other purposes. The user device 104 is a computing system that enables the user to receive one or more electronic communications and/or perform one or more user activities. The processing device 114 is operatively coupled to the communication device 112, input device(s) 108 (e.g., keypads/keyboards, touch screens, mouse/pointing devices, gesture/speech recognition sensors/devices, microphones, joysticks, authentication credential capture devices listed above, image capture devices, and other peripheral input devices), output device(s) 110 (screens, speakers, printers and other peripheral output devices) and other devices/components of the user device. The processing device 114 uses the communication device 112 to communicate with the network 101 and other devices on the network 101, such as, but not limited to the processing system 106 and the authentication system 107. As such, the communication device 112 generally comprises a modem, server, or other device for communicating with other devices on the network 101.

Each user device 104a-104d, typically comprises one or more user input devices 108, that are configured to receive instructions, commands, data, authentication credentials, audio/visual input and other forms of user input from the user, and transmit the received user input to the processing device 114 of the user device for processing. Similarly, each user device 104a-104d, typically comprises one or more user output devices 110, that are configured to transmit, display (e.g., via a graphical user interface), present, provide or otherwise convey an user output to the user, based on instructions from the processing device 114 of the user device. In some embodiments, the one or more user input devices 108 and/or one or more user output devices 110 are dual-function devices that are configured to both receive user input from the user and display output to the user (e.g., a touch screen display of a display device). For example, the dual function input devices 108 and/or the output devices 110 may present a user interface associated with one or more user device applications 112 (e.g., a graphical user interface) that is configured to receive user input and also provide user output.

The user device 104 comprises computer-readable instructions 120 and data storage 118 stored in the memory device 116, which in one embodiment includes the computer-readable instructions 120 of one or more user applications 122, e.g., a first device application and a second device application, (typically a plurality of user applications 122 such as operating system applications, device applications, third party applications, browser applications, network applications, and the like) that are structured for receiving/displaying an electronic communication and/or that facilitate performance of one or more user activities. In some embodiments, the first device application associated with a first communication medium (e.g., email application medium, social media application medium, or the like) of the one or more user applications 122 of a first user device refers to an application stored on the first user device that is configured to receive and display one or more electronic communications via an associated first user interface, and receive user instructions/input via the associated first user interface. In some embodiments, the second device application associated with a second communication medium (e.g., cellular messaging application medium, internet browser application medium, or the like) of the one or more user applications 122 of a second user device refers to an application stored on the second user device that is configured to receive and display one or more electronic communications via an associated second user interface, and receive user instructions/input via the associated second user interface.

As discussed, in some embodiments, the user device 104 may refer to multiple user devices that may be configured to communicate with the authentication system 107, the processing system 106 and/or the entity system 105 via the network 101. In some embodiment, the processing system 106, the entity system 105 and/or the authentication system 107 may transmit control signals to the user device, configured to cause the user application 122 to perform one or more functions or steps described herein.

As further illustrated in FIG. 1, the processing system 106 generally comprises a communication device 136, a processing device 138, and a memory device 140. As used herein, the term "processing device" or "processor" (e.g., processing devices 114, 138 and 148) generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the entity system 105, the user system 104 and the authentication system 107. As such, the communication device 136 (and/or communication devices 112 and 146) generally comprises a modem, server, or other device for communicating with other devices on the network 101.

As further illustrated in FIG. 1, the processing system 106 comprises computer-readable instructions 142 stored in the memory device 140, which in one embodiment includes the computer-readable instructions 142 of a processing system application 144 (also referred to as cross-channel electronic communication security application or a repurposed electronic application configuration application). In some embodiments, the memory device 140 includes data storage 141 (not illustrated) for storing data related to the system environment, but not limited to data created and/or used by the processing system application 144. In some embodiments, the processing system application 144 is configured for cross-channel electronic communication security with dynamic targeting and authentication protocol escalation/elevation triggering. Specifically, executing computer readable instructions of 142 of the processing system application 144 is configured to cause processing device 138 to transmit certain control instructions to the one or more user devices 104 (e.g., 104a-104d) to cause the respective processing devices (114) to carry out one or more steps described herein. Here, the processing system 106 (also referred to as "the system" herein) is configured to provide dynamic construction and targeting of adaptive repurposed malicious electronic communications for unsecure communication identification by a user. The processing system 106 is structured for configuring/constructing adaptive repurposed malicious electronic communications for interacting with users via user interfaces of the multiple electronic communication media (e.g., multiple electronic communication formats) and user devices 104. The processing system 106 is structured for configuring, dynamically and in real time, a repurposed malicious electronic communication for one electronic communication medium, based on and in response to, user actions on another repurposed malicious electronic communication on another electronic communication medium. The processing system 106 is also structured for escalating, in real-time, a level of authentication required for the user to execute the user activity based on user actions performed on the repurposed malicious electronic communications, among other steps described herein. The processing system 106 may communicate with the entity system 105, the user device 104, the authentication system 107, merchant systems and other third party systems (not illustrated) to perform one or more steps described above and through this disclosure, and/or cause these systems to perform one or more of these steps, at least in part.

In some embodiments, the processing system application 144 may control the functioning of the user device 104. In some embodiments, the processing system application 144 comprises computer readable instructions 142 or computer-readable program code, that when executed by the processing device 138, causes the processing device 138 to perform one or more steps involved. In some embodiments, the processing system 106, the authentication system 106 and/or the entity system 105 may be embodied in the same system, or alternatively, the processing system 106, the authentication system 106 and/or the entity system 105 may be separate systems as illustrated by FIG. 1.

As further illustrated in FIG. 1, the authentication system 107 generally comprises a communication device 146, a processing device 148, and a memory device 150. As discussed, as used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the processing system 106, the user system 104 and the entity system 105. As such, the communication device 146 generally comprises a modem, server, or other device for communicating with other devices on the network 101.

As further illustrated in FIG. 1, the authentication system 107 comprises computer-readable instructions 154 stored in the memory device 150, which in one embodiment includes the computer-readable instructions 154 of an authentication application 158. In some embodiments, the memory device 150 includes data storage 152 for storing data related to the system environment, but not limited to data created and/or used by the authentication application 158. In some embodiments, the authentication application 158 provides assessment of authentication requirements for user activities.

In the embodiment illustrated in FIG. 1 and described throughout much of this specification, the authentication application 158 may retrieve user authentication information, financial information based on instructions from the processing system 106. In this way, the authentication application 158 may communicate with the processing system 106, the user device 104, merchant systems and other third party systems (not illustrated).

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2A depicts a high level process flow of repurposing malicious electronic communications 201, in accordance with some embodiments of the invention. As illustrated in block 203, the process 201 is initiated by receiving a malicious electronic communication at an entity server, where the malicious electronic communication is directed to a user within the entity. In this way, the system may include a malicious communications identification system that identifies known malicious communications and blocks those communications before they are transmitted to the end user. This may include a filter with artificial intelligent learning of new malicious content and real-time blocking or prohibiting of communication transmission.

As illustrated in block 205, the process 201 continues by confirming that the received communication is malicious in nature. In this way, the system confirms the communication includes a link to a malicious URL, virus, spam, or the like associated with the communication.

The transmission of the malicious electronic communication is blocked at the entity level, such that it never is received by the user, as illustrated in block 207. In this way, once the communication is identified and confirmed as containing malicious content, the system may block the communication from being transmitted to the end user to prevent the malicious content from spreading to the user or the entity.

Next, as illustrated in block 209, the process 201 continues by scrubbing the malicious electronic communication of all malicious content, including URL information or the like. In this way, the system identifies the malicious content within the communication and cleans the malicious content, such as deleting the content from the electronic communication. In this way, the electronic communication may appear the same visually, but have the malicious content removed. As such, the electronic communication may appear the same from the user viewing the communication, this may include logos, fonts, figures, images, illustrations, and the like of the electronic communication. However, the system removed the malicious content from the communication, thus it is no long dangerous to the end user.

Finally, as illustrated in block 211, the process 201 is finalized by transmitting the scrubbed malicious electronic communication via a repurposed malicious electronic communication to the user for training on the identification of the malicious electronic communication by the user. In this way, the user may visualize a real malicious electronic communication that was scrubbed clean of malicious content. As such, the user is being trained by visualizing real malicious electronic communication for training instead of simulated communications.

FIG. 2B depicts a high level process flow of presenting repurposing malicious electronic communications for electronic communication training 200, in accordance with some embodiments of the invention. These steps may be performed by the processing system 106, via the processing system application 144. As alluded to previously, the system is typically configured for facilitating training of users for the purposes of identifying unsecure and malicious electronic communications, scrubbing those communications, transmitting the scrubbed repurposed electronic communication to the user, and monitor the unsuccessful or successful identification of repurposed malicious electronic communications by the user.

As discussed, an "electronic communication" may refer to an email, a cellular text message (e.g., Short Message Service (SMS) message, a Multimedia Messaging Service (MMS) message), a social media post (e.g., a public post, a notification, a social media message, or the like), a message associated with a messaging application (e.g., an instant message, or the like), a user device notification, a notification associated with an application of a user device, a pop-up notification, a communication associated with exchanging messages between users/devices using electronic devices, and/or the like. In some embodiments, the electronic communication may refer to an email type electronic communication.

Each type of electronic communication (e.g., email, text message, or the like) is typically associated with a communication medium. A "communication medium" of a particular electronic communication as used herein may refer to or be associated with at least one of the following communication medium components: (i) a message format associated with the electronic communication, (ii) a user application that is compatible with receiving/displaying/acting upon the electronic communication or the user application typically utilized by the user to view/act upon the electronic communication, (iii) a user device associated with receiving/displaying/acting upon the electronic communication or the user device containing the user application for receiving/displaying/acting upon the electronic communication, and (iv) a communication channel for transmitting the electronic communication to a user device. For example, a first electronic communication (e.g., a first repurposed electronic communication or a first repurposed malicious electronic communication) of an email type may be associated with a first communication medium directed to the following communication medium components corresponding to those listed above: i) an email message format (e.g., a RFC 5322 format, a Multipurpose Internet Mail Extensions or MIME format, a Simple Mail Transfer Protocol (SMTP) format, HTML format, header/subject/content structure and/or the like), (ii) an email web application or a browser application, (iii) a user computing device such as a desktop computer, and (iv) a first communication channel between the processing system 106 and the user computing device comprising a LAN network such as Wi-Fi among others such as a WAN and/or a IAN network. A second electronic communication (e.g., a second repurposed electronic communication or a second repurposed malicious electronic communication) of a cellular text message type may be associated with a second communication medium directed to the following communication medium components corresponding to those listed above: i) a cellular text message format (e.g., a SS7 protocol format, a Short Message Service format, a Multimedia Messaging Service format, message content structure and/or the like), (ii) a cellular text message application, (iii) a user mobile device such as a mobile phone/smartphone, and (iv) a second communication channel between the processing system 106 and the user computing device comprising a cellular network.

Electronic communications associated with different communication media typically differ with respect to at least one of the foregoing communication medium components. Continuing with the previous example, the communication media of the first electronic communication of the email type and the second electronic communication of the cellular text message type differ with respect to their message formats, user applications utilized for or compatible with receiving/viewing the communication, user devices that the communication are sent to or are configured to be sent to, and the communication channels for transmitting the communications to the respective devices. As another example, communication media of a third electronic communication of an email type and a fourth electronic communication of a social media post type may differ with respect to their message formats (e.g., an email message format and a social media post format, respectively) and user applications utilized for or compatible with receiving/viewing the communication (e.g., a mobile email application and a social media application, respectively). As yet another example, in some embodiments, a first email message and a second email message, although being the same electronic communication type, nevertheless, may comprise different communication media when the first message is structured for, or transmitted to, an email web application or a browser application and the second message is structured for, or transmitted to, a mobile email application of a smartphone. In some instances, the first email message and the second email message, although being the same electronic communication type, may yet comprise different communication media when the first message is structured for, or transmitted to, a first email account of the user associated with a first email application and the second message is structured for, or transmitted to, a second email account of the user associated with a second email application.

As illustrated by block 202, the system may repurpose a malicious electronic communication for a user, e.g., for training and testing purposes. The repurposed electronic communication may be a real malicious electronic communication that has been filtered by the entity and cleaned of malicious content. The remaining portions of the malicious electronic communication is visually the same as the original malicious electronic communication without the malicious content. As such, the communication may include logos, fonts, wording, and the like exactly the same as the originally transmitted malicious electronic communication without the malicious content. As such, a first repurposed malicious electronic communication is typically associated with a first electronic communication medium. Typically, the system constructs repurposed electronic communications based on a scrubbed version of a malicious electronic communications (e.g., those received at the user device and/or at other networked devices) that have been previously identified by the system as malicious. These malicious electronic communications may comprise unauthorized communications such as phish type electronic communications, unsolicited electronic communications (e.g., spam type communications) which may jeopardize the safety and security of user information and user devices. In this way, the system may scrub that information to provide the user with a scrubbed repurposed electronic communication to the user for training.

In some embodiments, the system repurposes the original malicious electronic communication based on removal of the previously identified malicious communications (e.g., phishing communications, malware or the like) such that the repurposed malicious electronic communication resembles the previously identified malicious electronic communication or a malicious electronic communication, while being benign, i.e., not posing a threat to the security of user information or user devices. It may not be readily apparent to the user that transmitted communication is a repurposed electronic communication for training and testing purposes. The user may then analyze the repurposed electronic communication and identify whether or not it is malicious. The system may then indicate the successful or unsuccessful identification of the malicious electronic communication, thereby educating/training the user to better identify electronic communications.

In some embodiments, the system constructs the repurposed electronic communication based on the scrubbed previously identified malicious communication by stripping out malicious content, while retaining the structure, font, format, and look-and-feel of the malicious communication. Here, the system may identify an unsecure portion of a malicious electronic communication. The unsecure portion typically comprises the malicious content that is associated with an unauthorized activity or causes an unauthorized activity when selected, click-on or otherwise acted upon, which adversely affects the security and safety of user information. Examples of types of unsecure portions may include malicious URLs, malicious attachments, unsolicited or spam electronic communications, URLs or attachments associated with spam, unsecure spoof reply addresses, and the like. Examples of unauthorized or malicious activities/actions may include unauthorized downloads, unauthorized data access/retrieval or interception, deleting data from a user device, sending spam, unauthorized redirecting to untrustworthy sites, presenting unsecure spoof interfaces for the purposes of unauthorized data gathering, and the like. In some embodiments, the system may deploy the repurposed malicious electronic communication in an isolated testing environment system of the processing system 106 that is isolated/quarantined/inaccessible from the rest of the processing system 106 and the network environment 100, for analyzing/identifying the malicious content. The system may strip out the unsecure portion from the malicious electronic communication. The system may then construct a repurposed unsecure component based on the unsecure portion such that the repurposed unsecure component is (i) associated with the predetermined malicious component type (e.g., URL type, attachment type or the like) and (ii) is benign, i.e., not associated with the unauthorized activity. For instance, the system may replace a malicious URL with trusted URL, replace the malicious URL with a placeholder URL, replace at least a portion of the malicious URL with random letters to generate a non-functioning URL, or the like, for constructing the repurposed unsecure component. For instance, the system may replace a malicious attachment with trusted attachment, replace the malicious attachment with a placeholder attachment, or the like, for constructing the repurposed unsecure component. The system may then construct the repurposed malicious electronic communication by removing the unsecure component into the first repurposed malicious electronic communication in the place of the unsecure portion that was stripped out.

In some embodiments, the repurposed electronic communication is transmitted to the user in a manner that the user typically receives electronic communications (e.g., using an email address associated with the user, to a user device that typically receives or is susceptible to the malicious content, or the like) so that it is not readily apparent to the user that a communication maybe malicious solely based on the communication type. In some embodiments, the system may identify a malicious electronic communication associated with an unauthorized activity. The system may then determine an electronic communication medium type (e.g., email, instant message, pop-up window, or the like) associated with the malicious electronic communication. The system may then present the first repurposed malicious electronic communication (or a second repurposed malicious electronic communication) such that the first electronic communication medium matches the electronic communication medium type.

As indicated by block 204, the first repurposed malicious electronic communication may comprises embedding an action tag in a body of the first repurposed malicious electronic communication. The action tag is typically structured for determining a predetermined user action associated with the repurposed malicious electronic communication. In other words the action tag is structured for identifying user actions with respect to the repurposed communication. The user actions may comprise deleting the repurposed malicious electronic communication, opening the repurposed malicious electronic communication or associated attachments/URLs, moving the repurposed malicious electronic communication to another folder or for storage at another location, reading the repurposed malicious electronic communication, flagging the repurposed malicious electronic communication as malicious, forwarding the repurposed malicious electronic communication, ignoring or not acting upon the repurposed malicious electronic communication for a predetermined time period, and/or the like. Typically the action tag comprises at least one of a tracking pixel or a tag, and/or the like. In some embodiments, the tracking pixel comprises a 1×1 pixel (or pixel tag) that is embedded into the repurposed electronic communication. In some embodiments, the action tag is structured such that a user action is configured to trigger the action tag to transmit a user device identifiers (e.g., IP addresses) or message identifiers (e.g., a unique identifier of the repurposed malicious electronic communication) to the system 106.

Next, the system may establish a first communication channel with a first user device (e.g., a tablet computer, a smart television, a laptop computer, or the like) of the plurality of networked devices (e.g., user devices 104) associated with the first repurposed malicious electronic communication associated with the first electronic communication medium. The first user device may comprise a first user application 122a is stored on the first user device (e.g., device 104b). The first device application 122a may be an application that is configured to receive and present the first repurposed malicious electronic communication to the user. Next, as illustrated by block 206, the system transmits, via the first communication channel, the first repurposed malicious electronic communication to the first user device.

The user may then analyze the email and identify whether or not it is malicious. Now, referring to block 208, the system may determine, via the embedded action tag, a first user action performed by the user on the first repurposed malicious electronic communication. For instance, based on presuming that the first repurposed electronic communication is malicious, the user may then perform a first user action of deleting the repurposed electronic communication without opening or reading or flagging the repurposed electronic communication for analysis by the system. In response to determining the first user action, the system may determine whether the first user action is associated with a successful or unsuccessful identification of the repurposed malicious electronic communication.

In response to determining that the user correctly identified the repurposed electronic communication (e.g., modelled after a previously identified malicious electronic communication) as malicious, the system typically transmits and/or displays a notification to the user indicating the successful identification. Here, the system may initiate a presentation of a training interface indicating a successful (or unsuccessful) identification of the first repurposed malicious electronic communication by the user, as indicated by block 210. For every successful identification, the system may award points to the user.

Similarly, in response to the user incorrectly identifying a repurposed electronic communication (e.g., based on a first user action of downloading a repurposed malicious attachment, clicking on a repurposed malicious URL, forwarding the repurposed communication to another user, or ignoring the repurposed electronic communication for a predetermined time period), the system typically transmits and/or displays a notification to the user indicating the correct malicious communication identification and may also display portions of the repurposed electronic communication that help identify and indicate whether or not it is malicious to help the user in future identifications. Here, the system may determine, via the embedded action tag, that the first user action performed by the user comprising an unsuccessful identification of the repurposed malicious electronic communication. In response, the system may, initiate a presentation of a training interface indicating the unsuccessful identification. The system may further initiate a presentation of the repurposed malicious electronic communication and overlay a graphical element (e.g., highlight, increased brightness, or the like) over a portion of the presentation of the repurposed malicious electronic communication associated with repurposed malicious content. In some embodiments, the system is also configured to transmit a notification to a training administrator user/system regarding the successful/unsuccessful identification of malicious communications by the user. This notification may then trigger training administrator user/system to provide customized training to the user, or modify the training communications transmitted to the user, e.g., based on the successful/unsuccessful identification of malicious communications by the user.

FIG. 3 depicts a high level process flow for identifying and scrubbing received malicious electronic communications 301, in accordance with some embodiments of the invention. As illustrated in block 303, the process 301 is initiated by receiving a malicious electronic communication from an outside source that is directed to a user within an entity. The system may identify malicious content within the electronic communication and stop it from being transmitted to the end user. As illustrated in block 305, the process 301 continues by confirming the electronic communication contains malicious content and the system may block the electronic communication from being transmitted to the end user. In this way, the end user may never receive the real malicious electronic communication containing the malicious content, because the system may block it prior to end user receiving it. Since the user may never see the communication, the user may never be trained as to identify a potential malicious electronic communication.

As illustrated in block 307, FIG. 3 continues by scrubbing the malicious electronic communication of all malicious content. In this way, the electronic communications may have the same visual appearance as the original malicious electronic communication, without the malicious content that could potentially harm the user device, entity system, or the like. Finally, the scrubbed electronic communication may be converted into a repurposed malicious electronic communication that maintains the original appearance of the malicious electronic communication without the malicious content associated therewith. The generated repurposed electronic communication may be transmitted to the user without malicious content for training of the user with respect to identification and action performance associated with electronic communication maliciousness identification.

FIG. 4 depicts a high level process flow for training via the repurposed malicious electronic communications. In particular, the high level process flow 300 illustrates escalation of complexity of future repurposed electronic communications, escalation of authentication requirements, or the like, in real-time based on user actions associated with previous repurposed electronic communications. These steps may be performed by the processing system 106, via the processing system application 144. As alluded to previously, the system is typically configured for facilitating training of users for the purposes of identifying unsecure and malicious electronic communications.

As illustrated by block 302, the system is configured to provide a second repurposed malicious electronic communication for the user based on the first user action. As illustrated block 304, in some embodiments, the system may provide a second repurposed malicious electronic communication that is associated with a second electronic communication medium, different from the first medium of the first repurposed malicious electronic communication. For example, based on a successful (or unsuccessful) identification of the first repurposed malicious electronic communication of an email type by the user, the system may identify and transmit the second repurposed malicious electronic communication to be of an instant message type (with same or different content as that of the first repurposed malicious electronic communication), to ensure that the user is able to correctly identify the repurposed malicious electronic communications across various media/channels.

In some embodiments, the first repurposed malicious electronic communication maybe associated with a first level of complexity, i.e., the first repurposed malicious electronic communication maybe associated with a spam type communication. For instance, based on a successful identification of the first repurposed malicious electronic communication by the user, the system may then construct the second repurposed malicious electronic communication to comprise an escalated, second, level of complexity, such that the second repurposed malicious electronic communication is associated with an escalated, second level of complexity, such that the second communication is associated with a phish type electronic communication.

As illustrated block 308, the system may escalate authentication requirements of the user for access to the second user interface associated with a second user application based on the user's unsuccessful (or successful) identification of the first repurposed malicious electronic communication. Here, the system may determine, via the embedded action tag, the first user action performed by the user comprising an unsuccessful identification of the first repurposed malicious electronic communication at a first user application. For instance, the system may determine that the user provided user authentication credentials at a repurposed malicious interface triggered by clicking on a repurposed URL of the first repurposed malicious electronic communication, based on incorrectly identifying the first repurposed malicious electronic communication as benign. The system may then determine that the user authentication credentials maybe compromised.

Here, in some embodiments, the system may identify that the user seeks to perform a user activity, e.g., a user request for access to a second user interface associated with a second user application (e.g., a financial institution application different from the application associated with viewing the first repurposed malicious electronic communication, another entity application, or the like). As discussed, the user activity (e.g., access to the second user interface) typically requires validation of one or more authentication credentials. Typically, execution of the user activity requires validation of one or more authentication credentials, based on the type of activity. In this regard, the user activity may be associated one or more authentication credentials related to an existing level of authentication. For example, a user activity comprising accessing a mobile device application may be require authentication using a username and password. The credentials of username and password may be associated with a first level of authentication. As another example, another user activity comprising initiating a purchase using a user application may require credentials with a second, higher level of authentication, for example payment instrument identifiers and their associated personal identification numbers (PIN).

In some embodiments, the request comprises the user accessing or opening an application associated with the activity, via the second user device. For example, the user opening a mobile banking application (second device application) to view account balances or opening a page within the application to modify account preferences. In some embodiments, the request comprises receiving the existing authentication credentials from the user. In some embodiments, the system constantly monitors the user's devices and activities based on requisite permissions from the user, and the subsequent steps are triggered, automatically, in response to the system identifying that the user seeks to execute the user activity. For example, the system may identify that the user seeks to initiate a purchase (user activity) based on determining that the user has initiated a check-out step for purchasing one or more products using a merchant application (second device application).

However, the existing level of authentication, associated with the activity itself, may not be satisfactory in instances where the user may be potentially exposed to misappropriation or in instances where chances of unauthorized access to the user's personal and financial information is heightened, e.g., unsuccessful identification of malicious electronic communications. The system may then escalate, in real-time, authentication requirements of the user for executing the user activity (e.g., access to the second user interface) based on the unsuccessful identification of the first repurposed malicious electronic communication. Here, in some embodiments, the system may prevent check-out, dissuade input of personal information, lock the display screen of the device or otherwise suspend certain functionality associated with the merchant application and/or the mobile device, until the requirement of escalated authentication is ascertained and/or authentication credentials associated with escalated levels of authentication are validated. In this regard, the system may be overarching and may be configured to control one or more applications, operating system, user interface and other functionality associated with the second user device, based on receiving prior authorization from the user.

The system may ascertain the escalated higher authentication level required based on the identified incorrect identification of the repurposed communication. Alternately, in some embodiments, the system may limit the permissible functions for the given standard level of authentication based on the unsuccessful identification of the first repurposed malicious electronic communication. For example, the system may only allow the user to view account balances, but may block payments/transactions.

Next, at block 310, the system may transmit, via a second communication channel associated with the second electronic communication medium, the second repurposed malicious electronic communication to the user. The system is configured to establish a second operative communication link with a second user device (e.g., a smart phone device, or the like) of the plurality of networked devices. As discussed the second user device is associated with the user and comprises another device application associated with a second medium structured for viewing/receiving/acting upon the second electronic communication medium. At block 312, the system may initiate a presentation of the training interface indicating a successful or unsuccessful identification of the second repurposed malicious electronic communication by the user.

As alluded to previously, the user is typically required to authenticate their identity in order to complete a user activity (e.g., an electronic transaction). Numerous types and levels of user authentication exist. For example, a user may authenticate their identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication. In some embodiments, the identity of the device being used by the user may be used to authenticate the identity of the user. The different types of authentication may provide differing degrees of confidence regarding the authentication using such types and thereby provide different levels of authentication. For example, if a username by itself is used for a first user authentication, and a username along with a password is used for a second authentication, then the second authentication should provide a higher confidence regarding the authentication because of the additional layer of authentication required. Therefore the second authentication is at a higher authentication level. Further, within the types of authentication, varying levels of confidence may be used. For example, when using a password, an administrator may require users to create a password according to strict rules designed to increase the security level of the password, and therefore increase the confidence/level of any authentication using the password.

Accordingly, a continuum of authentication may be used to quantify (or dictate) the levels of authentication. Likewise, a continuum of functions permitted may be used to quantify (or dictate) the number or context in which functions (e.g., types of activities) are permitted.

Referring to FIG. 5A, a continuum of authentication 400A is illustrated according to embodiments of the invention. On the left-hand side of the continuum, a "zero authentication"/lowest level of authentication requires no authentication credentials. On the right-hand side of the continuum, a "hard authentication"/highest level of authentication requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 5C, the continuum of authentication 400A may be coupled with a functions permitted continuum 400B, first illustrated in FIG. 5B.

Referring to FIG. 5B, the functions permitted continuum 400B illustrates various levels of functions (e.g., electronic activities) permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 400B corresponds with a certain amount and/or number of functions that are permitted and/or the context in which certain functions are permitted.

Referring now to FIG. 5C, a diagram 400C illustrates a coupling of the functions permitted continuum 400B and the levels of authentication continuum 400A. As shown, the continua 400B and 400A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 400B provides that a particular function or functions may be permitted given that a specified level of authentication credentials are supplied, as indicated by the corresponding point on continuum 400A. For example, the system, a financial institution and/or a user may arrange the continua 400B and 400A with respect to one another and may adjust the arrangement based on changing desires or goals.

In some embodiments, one or both the continua 400B and 400A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention. As noted, the level of authentication required to complete an electronic activity may be increased or decreased based on exposure events such as incorrect identification of malicious communications by the user. For example, if the user is typically required to provide a username and password to complete a type of activity, but the level of authentication required is increased in accordance with block 308, then the user may be prompted to provide additional (e.g., secondary) authentication information, such as a PIN or a zip code associated with the user.

Referring now to FIG. 5D, a diagram 400D illustrates a relationship between the functions permitted and the authentication types. As shown in FIG. 5D, the soft authentication continuum between zero authentication and hard authentication may include one or more authentication types (A, B, C in the Figure). In one aspect, the one or more authentication types corresponding to the one or more authentication credentials received from the user and one or more functions are positively correlated. In one aspect, the user may have to provide authentication credentials corresponding to authentication types A and B to perform moderate functions. In another aspect, the user may have to provide authentication credentials corresponding to authentication types A, B, and C to perform most functions. In yet another aspect, the user may have to only provide authentication credentials corresponding to authentication type A to perform minimal functions. For example, a username may enable the user to gain access to checking balance via an online banking application, a username and password may enable the user to gain access to checking balance, funds transfer between the user's first bank account and second bank account, and downloading previous statements, and a username, password and challenge question may enable the user to gain complete access to all the functions of an online banking transaction. By way of further example, the user may need to provide the zip code associated with the user's account in order for the user to complete a mobile wallet transaction that exceeds a defined threshold.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for repurposed electronic communication security, the system comprising:
    a memory device with computer-readable program code stored thereon;
    a communication device, wherein the communication device is configured to establish operative communication with a plurality of networked devices via a communication network;
    a processing device operatively coupled to the memory device and the communication device, wherein the processing device is configured to execute the computer-readable program code to:
        block an incoming malicious electronic communication at an entity level prior to being distributed to a user within the entity, wherein the incoming malicious electronic communication is associated with a first electronic communication medium;
        generate a repurposed malicious electronic communication for the user, wherein the repurposed malicious electronic communication is a scrubbed version of the incoming malicious electronic communication;
        transmit, via a first communication channel, the repurposed malicious electronic communication to a user device of the user associated with the first electronic communication medium;
        determine a user action performed by the user on the repurposed malicious electronic communication;
        determine, via an embedded action tag within the repurposed malicious electronic communication, the user action performed by the user comprising an unsuccessful identification of the repurposed malicious electronic communication at a user application; and
        escalate authentication requirements of the user for access to a user interface based on the unsuccessful identification of the repurposed malicious electronic communication.

2. The system of claim 1, wherein scrubbing the incoming malicious electronic communication further comprises removing malicious content including malicious URL links while maintaining a same visual appearance as the incoming malicious electronic communication.

3. The system of claim 1, wherein generating a repurposed malicious electronic communication for the user further comprises:
    identifying an unsecure portion of the incoming malicious electronic communication, wherein the unsecure portion is associated with an unauthorized activity; and
    constructing a repurposed unsecure component based on the unsecure portion such that the repurposed unsecure component is visually similar but not associated with the unauthorized activity,
    wherein constructing the repurposed malicious electronic communication further comprises removing the unsecure portion from the incoming malicious electronic communication from the repurposed malicious electronic communication and replacing the unsecure component with the repurposed unsecure component.

4. The system of claim 1, wherein determining the user action performed by the user on the repurposed malicious electronic communication further comprises embedding an action tag in a body of the repurposed malicious electronic communication, wherein the action tag is structured for determining a user action associated with the repurposed malicious electronic communication, wherein the action tag comprises a tracking pixel.

5. The system of claim 1, further comprising:
generating a second repurposed malicious electronic communication for the user based on the user action, wherein the second repurposed malicious electronic communication is associated with a second electronic communication medium;
transmitting, via a second communication channel associated with the second electronic communication medium, the second repurposed malicious electronic communication to the user;
determining, via an embedded action tag, the user action performed by the user comprising an unsuccessful identification of the second repurposed malicious electronic communication at a user application; and
escalating authentication requirements of the user for access to a user interface based on the unsuccessful identification of the second repurposed malicious electronic communication.

6. A computer program product for repurposed electronic communication security, the computer program product comprising at least one non-transitory computer-readable medium having computer-readable program code portions embodied therein, the computer-readable program code portions comprising:
an executable portion configured for blocking an incoming malicious electronic communication at an entity level prior to being distributed to a user within the entity, wherein the incoming malicious electronic communication is associated with a first electronic communication medium;
an executable portion configured for generating a repurposed malicious electronic communication for the user, wherein the repurposed malicious electronic communication is a scrubbed version of the incoming malicious electronic communication;
an executable portion configured for transmitting, via a first communication channel, the repurposed malicious electronic communication to a user device of the user associated with the first electronic communication medium;
an executable portion configured for determining a user action performed by the user on the repurposed malicious electronic communication;
an executable portion configured for determining, via an embedded action tag within the repurposed malicious electronic communication, the user action performed by the user comprising an unsuccessful identification of the repurposed malicious electronic communication at a user application; and
an executable portion configured for escalating authentication requirements of the user for access to a user interface based on the unsuccessful identification of the repurposed malicious electronic communication.

7. The computer program product of claim 6, wherein scrubbing the incoming malicious electronic communication further comprises removing malicious content including malicious URL links while maintaining a same visual appearance as the incoming malicious electronic communication.

8. The computer program product of claim 6, wherein generating a repurposed malicious electronic communication for the user further comprises:

identifying an unsecure portion of the incoming malicious electronic communication, wherein the unsecure portion is associated with an unauthorized activity; and
constructing a repurposed unsecure component based on the unsecure portion such that the repurposed unsecure portion is visually similar but not associated with the unauthorized activity,
wherein constructing the repurposed malicious electronic communication further comprises removing the unsecure component from the incoming malicious electronic communication from the repurposed malicious electronic communication and replacing the unsecure component with the repurposed unsecure component.

9. The computer program product of claim 6, wherein determining the user action performed by the user on the repurposed malicious electronic communication further comprises embedding an action tag in a body of the repurposed malicious electronic communication, wherein the action tag is structured for determining a user action associated with the repurposed malicious electronic communication, wherein the action tag comprises a tracking pixel.

10. The computer program product of claim 6, further comprising:
an executable portion configured for generating a second repurposed malicious electronic communication for the user based on the user action, wherein the second repurposed malicious electronic communication is associated with a second electronic communication medium;
an executable portion configured for transmitting, via a second communication channel associated with the second electronic communication medium, the second repurposed malicious electronic communication to the user;
an executable portion configured for determining, via an embedded action tag, the user action performed by the user comprising an unsuccessful identification of the second repurposed malicious electronic communication at a user application; and
an executable portion configured for escalating authentication requirements of the user for access to a user interface based on the unsuccessful identification of the second repurposed malicious electronic communication.

11. A computer-implemented method for repurposed electronic communication security, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
blocking an incoming malicious electronic communication at an entity level prior to being distributed to a user within the entity, wherein the incoming malicious electronic communication is associated with a first electronic communication medium;
generating a repurposed malicious electronic communication for the user, wherein the repurposed malicious electronic communication is a scrubbed version of the incoming malicious electronic communication;
transmitting, via a first communication channel, the repurposed malicious electronic communication to a user device of the user associated with the first electronic communication medium;

determining a user action performed by the user on the repurposed malicious electronic communication;

determining, via an embedded action tag within the repurposed malicious electronic communication, the user action performed by the user comprising an unsuccessful identification of the repurposed malicious electronic communication at a user application; and escalating authentication requirements of the user for access to a user interface based on the unsuccessful identification of the repurposed malicious electronic communication.

12. The computer-implemented method of claim 11, wherein scrubbing the incoming malicious electronic communication further comprises removing malicious content including malicious URL links while maintaining a same visual appearance as the incoming malicious electronic communication.

13. The computer-implemented method of claim 11, wherein generating a repurposed malicious electronic communication for the user further comprises:

identifying an unsecure portion of the incoming malicious electronic communication, wherein the unsecure portion is associated with an unauthorized activity; and constructing a repurposed unsecure portion based on the unsecure portion such that the repurposed unsecure component is visually similar but not associated with the unauthorized activity, wherein constructing the repurposed malicious electronic communication further comprises removing the unsecure component from the incoming malicious electronic communication from the repurposed malicious electronic communication and replacing the unsecure component with the repurposed unsecure component.

14. The computer-implemented method of claim 11, wherein determining the user action performed by the user on the repurposed malicious electronic communication further comprises embedding an action tag in a body of the repurposed malicious electronic communication, wherein the action tag is structured for determining a user action associated with the repurposed malicious electronic communication, wherein the action tag comprises a tracking pixel.

15. The computer-implemented method of claim 11, further comprising:

generating a second repurposed malicious electronic communication for the user based on the user action, wherein the second repurposed malicious electronic communication is associated with a second electronic communication medium;

transmitting, via a second communication channel associated with the second electronic communication medium, the second repurposed malicious electronic communication to the user;

determining, via an embedded action tag, the user action performed by the user comprising an unsuccessful identification of the second repurposed malicious electronic communication at a user application; and escalating authentication requirements of the user for access to a user interface based on the unsuccessful identification of the second repurposed malicious electronic communication.

\* \* \* \* \*